US012766454B2

(12) United States Patent
Park et al.

(10) Patent No.: US 12,766,454 B2
(45) Date of Patent: Oct. 20, 2026

(54) VOC ADSORPTION-DESORPTION APPARATUS FOR VOLATILE ORGANIC COMPOUND CONDENSING SYSTEM

(71) Applicant: EMSOLUTION CO., Ltd., Suwon-si (KR)

(72) Inventors: Hoon Min Park, Yongin-si (KR); Dong Hwan Jeon, Yongin-si (KR); Dal Hwan Yoon, Jecheon-si (KR); Heung Ki Min, Seongnam-si (KR)

(73) Assignee: EMSOLUTION CO., Ltd., Suwon-si (KR)

( * ) Notice: Subject to any disclaimer, the term of this patent is extended or adjusted under 35 U.S.C. 154(b) by 355 days.

(21) Appl. No.: 18/392,085

(22) Filed: Dec. 21, 2023

(65) Prior Publication Data

US 2024/0207775 A1 Jun. 27, 2024

(30) Foreign Application Priority Data

Dec. 21, 2022 (KR) .......................... 10-2022-018709

(51) Int. Cl.
*B01D 53/04* (2006.01)
*B01D 46/00* (2022.01)

(52) U.S. Cl.
CPC ..... *B01D 53/0407* (2013.01); *B01D 46/0036* (2013.01); *B01D 2201/31* (2013.01); *B01D 2257/708* (2013.01)

(58) Field of Classification Search
None
See application file for complete search history.

(56) References Cited

U.S. PATENT DOCUMENTS 3,458,050 A * 7/1969 Cooper .................. B01D 35/02 210/493.2
4,514,875 A * 5/1985 Comer ............... B01D 46/4227 15/352

(Continued)

FOREIGN PATENT DOCUMENTS

EP 2906320 B1 * 8/2020 ......... B01D 46/2411
KR 20060133937 A * 12/2006 ............. B21B 27/00

(Continued)

OTHER PUBLICATIONS

Translation of KR 20060133937 (Year: 2006).*

*Primary Examiner* — Brit E. Anbacht
(74) *Attorney, Agent, or Firm* — Boyle Fredrickson S.C.

(57) ABSTRACT

A VOC adsorption-desorption apparatus for volatile organic compound condensing system is disclosed. The VOC adsorption-desorption apparatus according to the present invention is characterized by comprising: an upper plate having a circular hole formed in the center of a circular plate; a lower plate having a diameter smaller than the outer diameter of the upper plate but larger than the diameter of the hole; a filter installed between the upper plate and the lower plate and around a through hole being extended from the hole of the upper plate toward the lower plate; and a filter protection net formed in the shape of a net and being extended from an outer circumference of the upper plate to an outer circumference of the lower plate to surround the filter.

2 Claims, 7 Drawing Sheets
(1 of 7 Drawing Sheet(s) Filed in Color)

(56) References Cited

U.S. PATENT DOCUMENTS

| | | | | | |
|---|---|---|---|---|---|
| 5,128,039 | A * | 7/1992 | Gabrielson | B01D 29/111 210/450 |
| 6,348,086 | B1 * | 2/2002 | Harms | B01D 46/0056 55/438 |
| 8,888,885 | B2 * | 11/2014 | Barreteau | B01D 46/2411 55/497 |
| 2003/0127402 | A1 * | 7/2003 | Deibel | B29C 66/612 210/443 |
| 2003/0222010 | A1 * | 12/2003 | Bassett | B01D 27/06 210/321.89 |
| 2004/0025485 | A1 * | 2/2004 | Lee | B01D 46/2414 55/486 |
| 2005/0115886 | A1 * | 6/2005 | Choo | B01D 29/58 210/333.1 |
| 2007/0267337 | A1 * | 11/2007 | Yang | B01D 27/144 166/227 |
| 2012/0180444 | A1 * | 7/2012 | Nikolin | B01D 29/111 210/485 |
| 2020/0139289 | A1 * | 5/2020 | Tapper | B01D 46/58 |
| 2024/0207775 | A1 * | 6/2024 | Park | B01D 46/0036 |
| 2024/0207819 | A1 * | 6/2024 | Park | B01J 20/3466 |
| 2026/0014497 | A1 * | 1/2026 | Hartung | B01D 29/21 |

FOREIGN PATENT DOCUMENTS

| | | | | |
|---|---|---|---|---|
| KR | 100826891 | B1 * | 5/2008 | B21B 15/0085 |
| KR | 20150134134 | A * | 12/2015 | B01D 46/00 |
| KR | 101847489 | | 4/2018 | |

* cited by examiner

VOC ADSORPTION-DESORPTION APPARATUS FOR VOLATILE ORGANIC COMPOUND CONDENSING SYSTEM

CROSS REFERENCE TO RELATED APPLICATIONS

This application claims benefit of priority of Korean Patent Application No. KR 10-2022-0180709, filed on Dec. 21, 2022, the contents of which are hereby incorporated by reference.

TECHNICAL FIELD

The present invention relates to a VOC adsorption-desorption apparatus for volatile organic compound condensing system, and more particularly, to a VOC adsorption-desorption apparatus for volatile organic compound condensing system capable of minimizing residual VOC remaining on a filter without falling after being pressurized with steam or nitrogen gas.

BACKGROUND ART

In general, volatile organic compounds (VOCs) are very harmful substances being generated from facilities using various organic solvents such as semiconductor facilities, petroleum refineries, petrochemical manufacturing facilities, gas stations, paint manufacturing facilities, laundry, printing and publishing facilities, road paving facilities, painting facilities, and the like. Therefore, the installation of facilities for the removal of VOCs is required in workplaces using organic solvents.

A facility for removing VOC adsorbs VOC using an adsorbent such as granular activated carbon and the adsorbed VOC is desorbed at a high concentration in the filter and then cooled to recover it in a liquid state, and such a facility is called a volatile organic compound condensing system.

At this time, the volatile organic compound condensing system generally includes two housings and two filters belonging thereto, in which an adsorption process for adsorbing VOCs is performed in one filter while a desorption process for desorbing adsorbed VOCs is performed in the other filter, and the adsorption process and the desorption process are performed alternately and repeatedly, thereby allowing the filter to be used for a long time.

Meanwhile, the desorption process allows VOCs adsorbed on the filter to be desorbed from the filter by the thermal fluid (high temperature steam or high temperature nitrogen gas) being supplied as high-temperature steam or high-temperature nitrogen gas are supplied from the upper direction of the adsorption and desorption unit toward the through hole.

However, since the desorption process of a general adsorption and desorption unit supplies high-temperature steam or high-temperature nitrogen gas from the upper side of the adsorption and desorption unit, the adsorption and desorption unit has a large supply power, so the adsorbed VOCs can easily fall, but as the amount of supply of the high-temperature steam or high-temperature nitrogen gas passing through the upper filter decreases as it travels toward the lower end of the adsorption and desorption unit, there is a problem in that residual VOCs remaining on the filter without falling even after the desorption process occur.

PATENT LITERATURE

Registered Patent Publication No. 10-1847489 (Registration date: Apr. 4, 2018)

DETAILED DESCRIPTION OF THE INVENTION

Technical Subject

The present invention is invented for solving the above problems, and its purpose is to provide a VOC adsorption-desorption apparatus for volatile organic compound condensing system capable of minimizing residual VOCs remaining on the filter without falling off after supplying high-temperature steam or high-temperature nitrogen gas.

Technical Solution

A VOC adsorption-desorption apparatus for volatile organic compound condensing system according to an aspect of the present invention for achieving the above object is characterized by comprising: an upper plate having a circular hole formed in the center of a circular plate; a lower plate having a diameter smaller than the outer diameter of the upper plate but larger than the diameter of the hole; a filter installed between the upper plate and the lower plate and around a through hole being extended from the hole of the upper plate toward the lower plate; and a filter protection net formed in the shape of a net and being extended from an outer circumference of the upper plate to an outer circumference of the lower plate to surround the filter.

Here, the filter is preferably installed inside an outer circumferential surface being formed by connecting an outer circumference of the upper plate and an outer circumference of the lower plate.

The through hole is formed in a shape in which the diameter of the hole of the upper plate is maintained the same from the upper plate to the lower plate.

In addition, the through hole may be formed in a shape in which the diameter of the hole of the upper plate gradually decreases from the upper plate to the lower plate.

Advantageous Effects

According to the present invention, it is possible to minimize residual VOCs remaining on a filter without falling off after pressurizing thereof with high-temperature steam or high-temperature nitrogen gas.

BRIEF DESCRIPTION OF DRAWINGS

The patent or application file contains at least one drawing executed in color. Copies of this patent or patent application publication with color drawing(s) will be provided by the Office upon request and payment of the necessary fee.

SPECIFIC CONTENTS FOR IMPLEMENTING THE INVENTION

Figure 1:
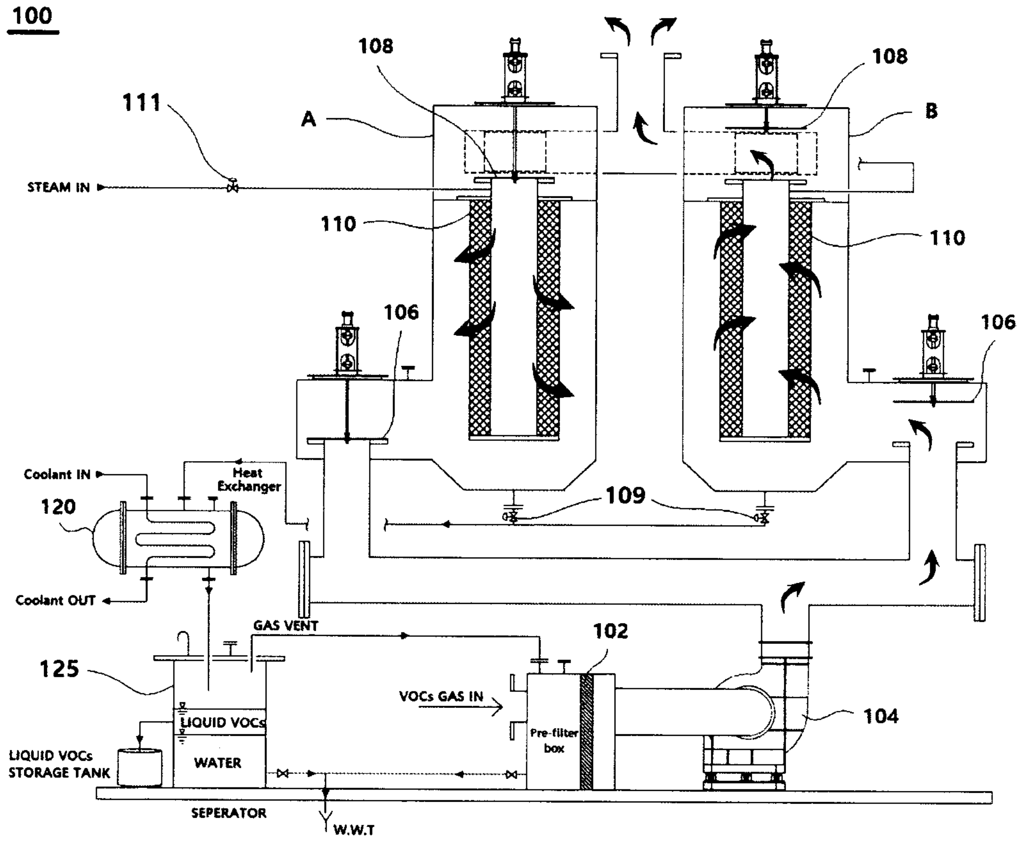
FIG. 1 is a diagram schematically illustrating a volatile organic compound condensing system according to an embodiment of the present invention.

Hereinafter, some embodiments of the present invention will be described through exemplary drawings. In describing the reference numerals to the components of each drawing, for the same components, even if they are displayed on different drawings, they are indicated with the same reference numerals as much as possible. In addition, in describing an embodiment of the present invention, if it is determined that a detailed description of a related known configuration or function hinders understanding of the embodiment of the present invention the detailed description will be omitted.

In addition, terms such as first, second, A, B, (a), and (b) may be used in describing components of an embodiment of the present invention. These terms are only used to distinguish the component from other components, and the nature, order, or sequence of the corresponding component is not limited by the term. When a component is described as being "connected", "coupled" or "interconnected" to another component, the component may be directly connected, coupled or interconnected to the other component, but it should be understood that another component may be "connected", "coupled" or "interconnected" between the component and the other component.

FIG. 1 is a diagram schematically illustrating a volatile organic compound condensing system according to an embodiment of the present invention.

Referring to FIG. 1, a volatile organic compound condensing system 100 according to an embodiment of the present invention includes an adsorption-desorption unit 110 and a heat exchange unit 120.

The adsorption-desorption unit 110 repeatedly performs an adsorption process of adsorbing volatile organic compounds from a supply gas and a desorption process of desorbing volatile organic compounds by supplying heating gas to the volatile organic compounds adsorbed by the adsorption process.

At this time, the adsorption-desorption unit 110 is provided in two A and B, and implemented in that when one adsorption-desorption unit 110 performs the desorption process A, the other adsorption-desorption unit 110 performs the adsorption process B. Such a desorption process and an adsorption process are alternately and repeatedly performed.

Hereinafter, a VOC removal process by the volatile organic compound condensation system 100 will be described.

Contaminated gas generated in the production line is sent to the blower 104 through the pre-filter 102, and the blower 104 sends the contaminated gas that has passed through the pre-filter 102 to the line of the adsorption-desorption unit 110.

At this time, a line opening-closing device 106 is installed in the line of each adsorption-desorption unit 110, and opening and closing of the line is controlled depending on whether the corresponding adsorption-desorption unit 110 performs a desorption process or an adsorption process.

That is, the line opening-closing device 106 on the A side responding to the desorption process closes the line directing the adsorption-desorption unit 110 on the A side, and the line opening-closing device 106 on the B side responding to the adsorption process opens the line directing the adsorption-desorption unit 110 on the B side, thereby allowing contaminated air to flow into the adsorption-desorption unit 110 on the B side.

Figure 2:
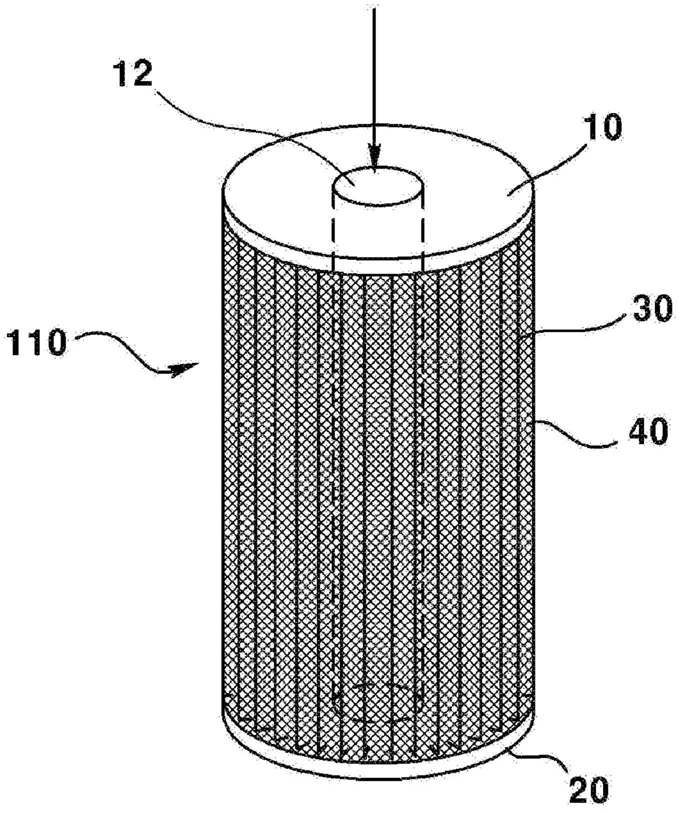
FIG. 2 is a diagram showing an example of an adsorption-desorption unit being used in the volatile organic compound condensing system of FIG. 1.

At this time, each adsorption-desorption unit 110 includes an upper plate 10, a lower plate 20, a filter 30, and a filter protection net 40, as illustrated in FIG. 2.

In the upper plate 10, a circular hole is formed in the center of a circular plate. In addition, the lower plate 20 is formed of a circular plate having the same diameter as the outer diameter of the upper plate 10. At this time, a through hole 12 being extended from the upper plate 10 to the lower plate 20 with the same diameter as the diameter of the hole of the upper plate 10 is formed, and a filter protection net 40 in the form of a net for protecting the filter 30 is installed between an outer circumference of the upper plate 10 and an outer circumference of the lower plate 20. Thus, the adsorption-desorption unit 110 has a cylindrical shape.

Figure 3:
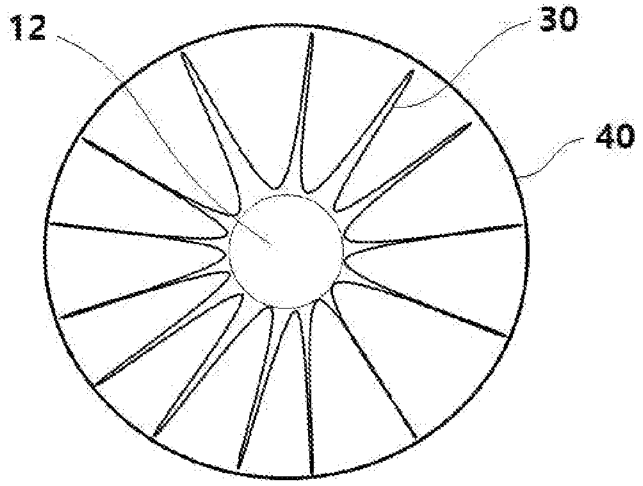
FIG. 3 is a plan view showing a horizontal cross-sectional view of the adsorption-desorption unit of FIG. 2.

In addition, the adsorption-desorption unit 110 enables the filters 30 to be overlapped with each other in a zigzag form between the through hole 12 and the filter protection net 40. At this time, the shape in which the filters 30 are overlapped is the same as a horizontal cross-section illustrated in FIG. 3 when viewed from above. Although the intervals between the overlapping filters are shown to be somewhat apart in order to help the understanding of the invention, the intervals between the filters may be disposed to be overlapped with each other more closely. Thus, the adsorption-desorption unit 110 allows the contaminated gas to pass through the filter protection net 40 and easily come into contact with the filters 30.

In addition, each adsorption-desorption unit 110 may include a pressurization device 108 of high-temperature vapor or high-temperature nitrogen gas at an upper end of each filter 30. At this time, the pressurization device 108 on the B side corresponding to the adsorption process is opened, and VOCs in the polluted gas are condensed by an adsorbent such as granular activated carbon and filtered by the filter 30, thereby releasing clean gas to the atmosphere.

High-temperature steam or high-temperature nitrogen gas is introduced into the adsorption-desorption unit 110 responding to the desorption process on the B side, and the pressurization device 108 on the B side supplies high-temperature steam or high-temperature nitrogen gas to the through hole 12 of the adsorption-desorption unit 110 of the cylindrical shape. Accordingly, VOCs adsorbed by the filter 30 are desorbed from the filter 30, and the desorbed VOCs are transferred to the heat exchange unit 120, cooled by cooling water, condensed into a liquid state, and transferred to the separator 125. At this time, in the separator 125, layer separation is performed by a difference in specific gravity in a state in which liquid water and liquid VOC are mixed, and the gaseous low-concentration VOCs transported together are sent to the pre-filter 102 to undergo the above-described process again.

However, since the above-described desorption process by the adsorption-desorption unit 110 supplies high-temperature steam or high-temperature nitrogen gas from the upper side of the adsorption-desorption unit 110, the adsorbed VOCs can easily fall at an upper end of the adsorption-desorption unit 110 due to a large supply, but the supply volume of the high-temperature steam or high-temperature nitrogen gas passing through the upper filter decreases as it goes to the lower end of the adsorption-desorption unit, and thus, residual VOCs that do not fall off after the desorption process and remain on the filter may occur.

Figure 4:
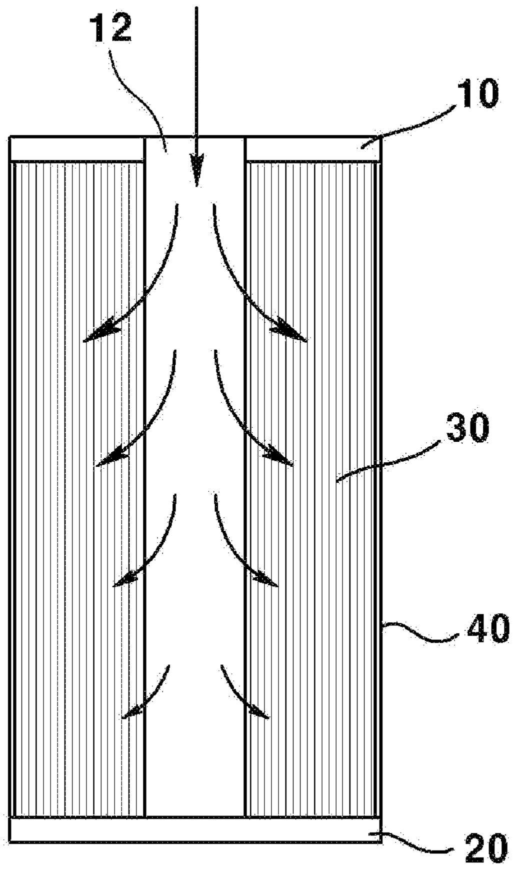
FIG. 4 is a cross-sectional view illustrated to explain the pressurizing force of steam or nitrogen gas to the adsorption and desorption unit of FIG. 2.

That is, as illustrated in FIG. 4, in a general adsorption-desorption unit 110, the supply amount reaching the filter 30 is large at the upper end thereof so that VOCs adsorbed on the corresponding portion are easily removed by the supply of high-temperature steam or high-temperature nitrogen gas.

However, since the supply amount of high-temperature steam or high-temperature nitrogen gas decreases as it travels toward the lower end of the adsorption-desorption unit 110, VOCs adsorbed at the lower end may remain adsorbed without falling off.

Figure 5:
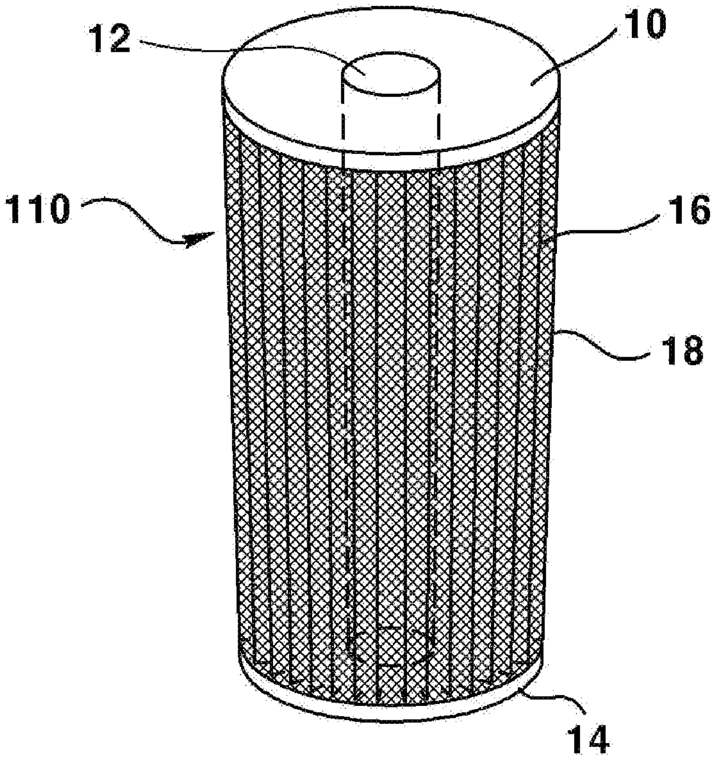
FIG. 5 is a view showing an adsorption-desorption unit according to another embodiment of the present invention.

In order to improve this problem, the adsorption-desorption unit 110 according to an embodiment of the present invention, as illustrated in FIG. 5, with respect to the upper plate 10 in which a circular hole is formed in the center of the circular plate, the lower plate 14 is formed to have a diameter smaller than the outer diameter of the upper plate 10 but larger than the diameter of the hole.

The filter 16 is installed between the upper plate 10 and the lower plate 14, and is installed around a through hole being extended from the hole of the upper plate 10 to the lower plate 14. At this time, the filter 16 is preferably installed inside the outer circumferential surface formed by connecting the outer circumference of the upper plate 10 and the outer circumference of the lower plate 14.

The filter protection net 18 is made in the shape of a net, and is installed to surround the filter 16 by being extended from the outer circumference of the upper plate 10 to the outer circumference of the lower plate 14.

Figure 6:
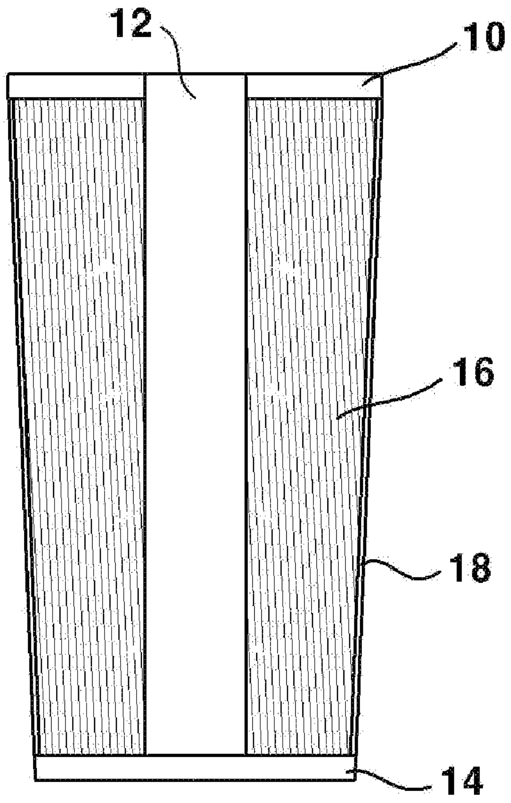
FIG. 6 is a cross-sectional view of the adsorption-desorption unit of FIG. 5.

Here, the through hole 12 may be formed in a shape in which the diameter of the hole of the upper plate 10 remains the same from the upper plate 10 to the lower plate 14, as illustrated in FIG. 6. In addition, the through hole 12 may be formed in a shape in which the diameter of the hole of the upper plate 10 gradually decreases from the upper plate 10 to the lower plate 14, as illustrated in FIG. 7.

Thus, in an adsorption-desorption unit 110 according to an embodiment of the present invention, as illustrated in FIG. 6, since the thickness of the filter 16 between the through hole 12 and the filter protection net 18 decreases as it travels from the upper end to the lower end, even if the pressure of the steam or nitrogen gas pressurized through the through hole 12 decreases as it travels toward the bottom, VOCs adsorbed at the lower end easily fall off.

Figure 7:
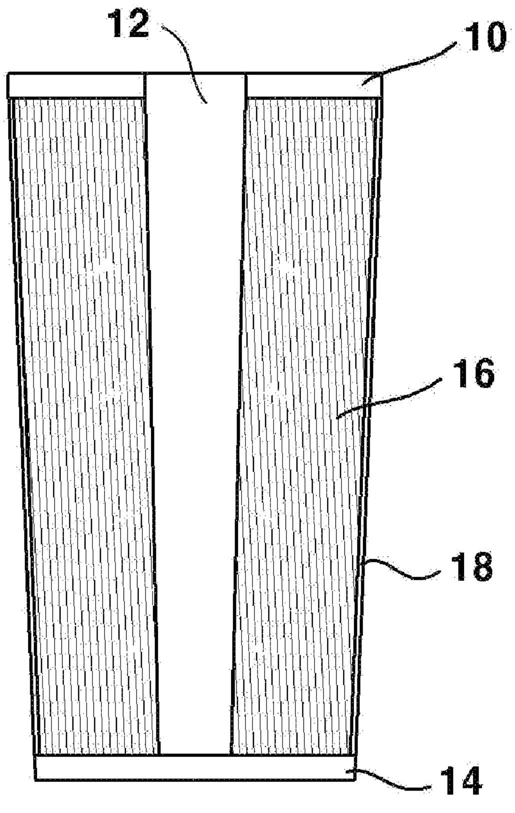
FIG. 7 is a cross-sectional view of an adsorption-desorption unit according to another embodiment of the present invention.

In addition, in an adsorption-desorption unit 110 according to another embodiment of the present invention, as illustrated in FIG. 7, the through hole 12 becomes narrower as it travels from the upper end to the lower end, the same pressing force as the upper end is applied to the lower end of the filter 16, thereby allowing VOCs adsorbed on the lower end to be fell off easily.

Figure 8:
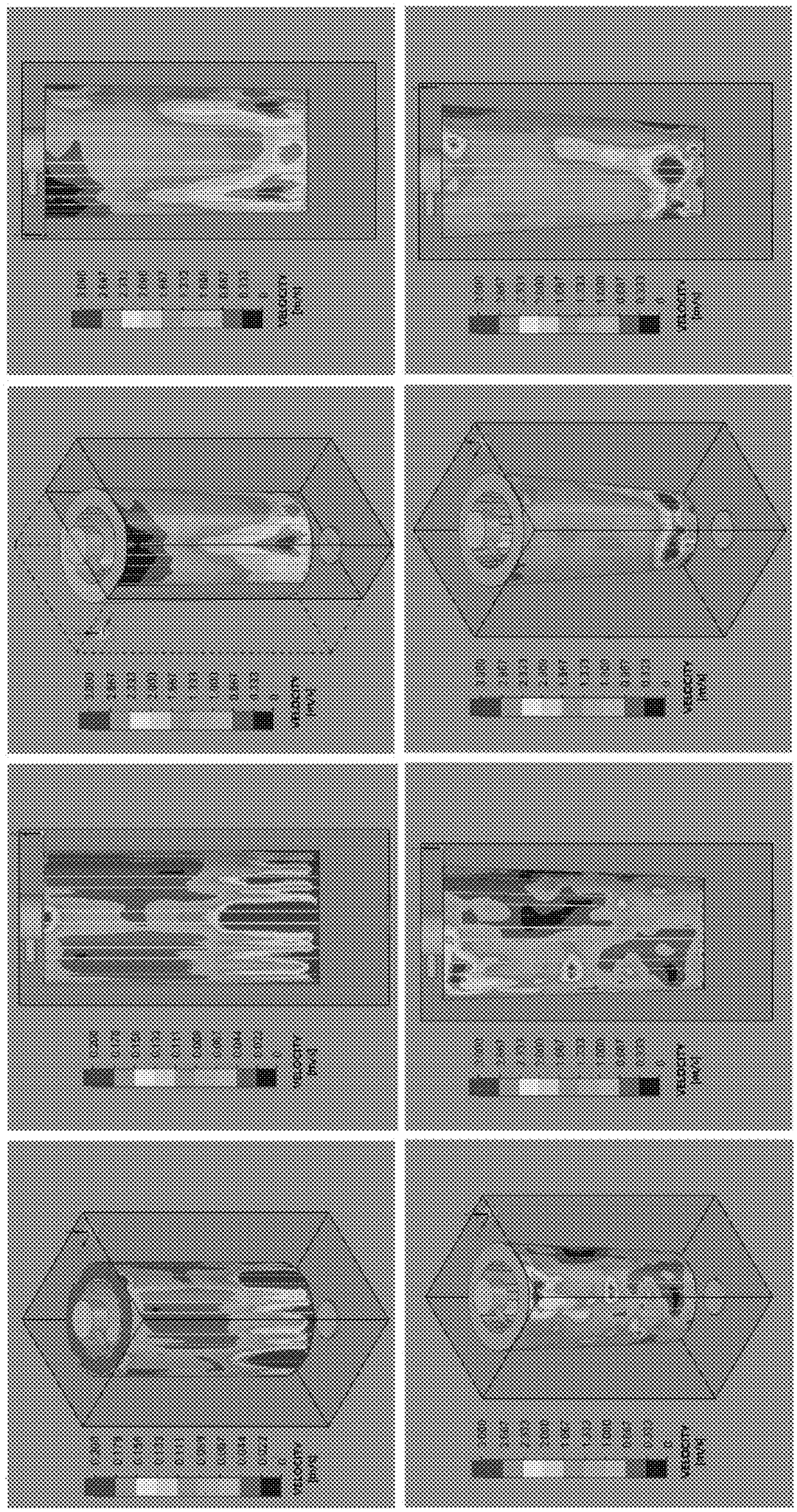
FIG. 8 is a view showing an example of confirming the flow characteristics of the adsorption-desorption unit according to an embodiment of the present invention using a computer analysis program.

As a result of confirming the flow characteristics of high-temperature steam or high-temperature nitrogen gas according to the shape change of the adsorption-desorption unit 110 using a computer analysis program, as illustrated in FIG. 8, when the lower surface was smaller than the upper surface, it was confirmed that high-temperature steam or high-temperature nitrogen gas passed through the entire filter evenly.

Although the embodiments according to the present invention have been described above, this is merely illustrative, and those skilled in the art will understand that various modifications and equivalent embodiments are possible therefrom. Therefore, the protection scope of the present invention should be defined by the following claims as well as those equivalent thereto.

We claim:

1. A VOC adsorption-desorption apparatus for volatile organic compound condensing system comprising:
- an upper plate having a circular hole formed in the center of a circular plate;
- a lower plate having a diameter smaller than the outer diameter of the upper plate but larger than the diameter of the hole;
- a filter installed between the upper plate and the lower plate and around a through hole being extended from the hole of the upper plate toward the lower plate; and
- a filter protection net formed in the shape of a net and being extended from an outer circumference of the upper plate to an outer circumference of the lower plate to surround the filter,
- wherein a diameter of the through hole is maintained the same from the upper plate to the lower plate, and
- wherein a thickness of the filter between the through hole and the filter protection net decreases as it travels from the upper plate to the lower plate.

2. The VOC adsorption-desorption apparatus for volatile organic compound condensing system according to claim 1,
- wherein the filter is installed inside the outer circumferential surface being formed by connecting the outer circumference of the upper plate and the outer circumference of the lower plate.

* * * * *